B. G. PATTERSON.
HAY BALE TYING DEVICE.
APPLICATION FILED OCT. 25, 1913.
1,152,209.
Patented Aug. 31, 1915.
7 SHEETS—SHEET 1.
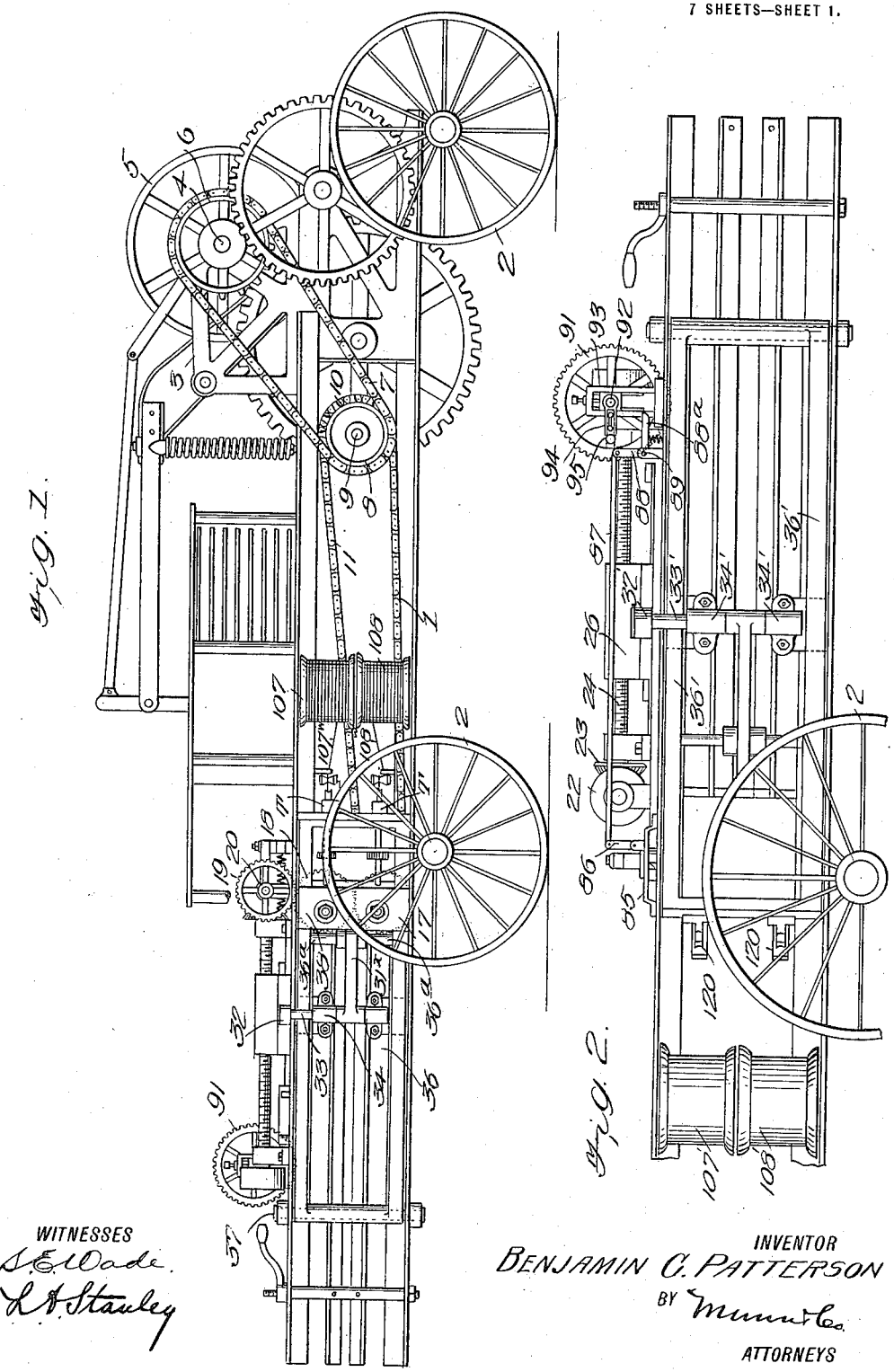
WITNESSES
S. E. Wade.
L. A. Stanley
INVENTOR
BENJAMIN G. PATTERSON
BY Munn & Co.
ATTORNEYS

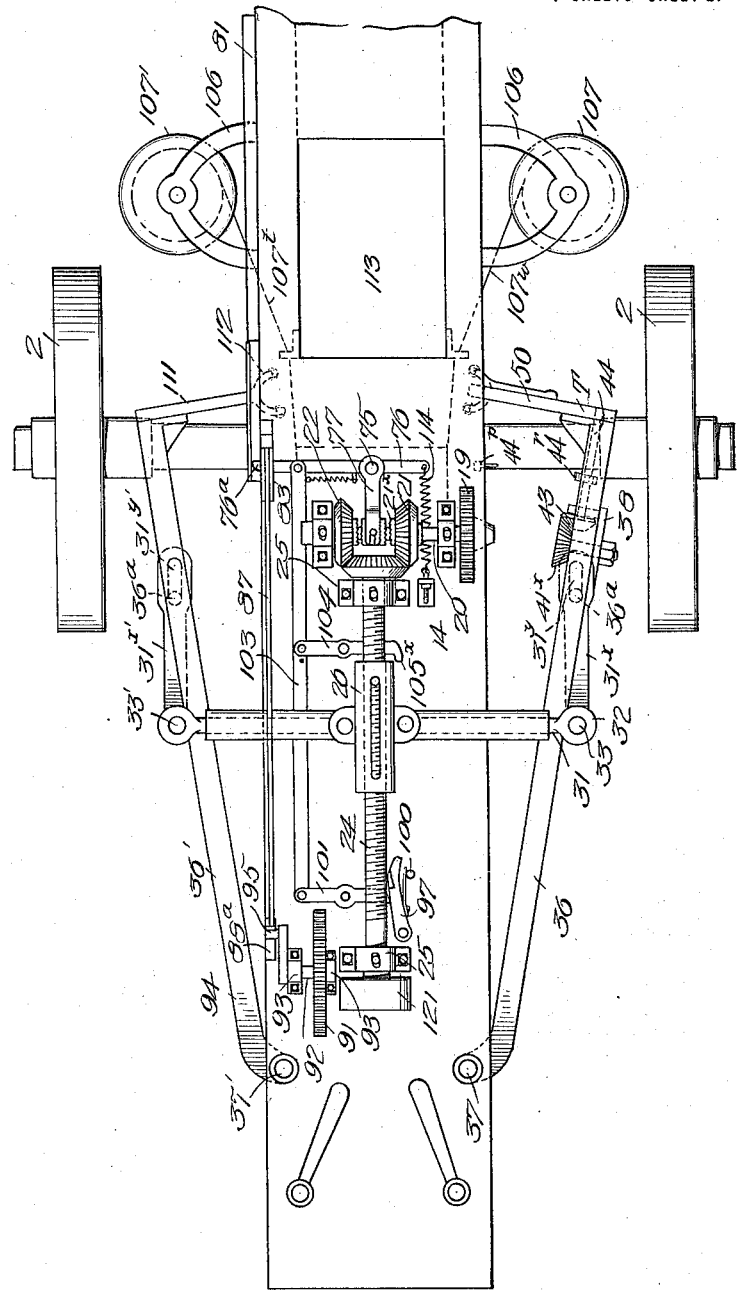

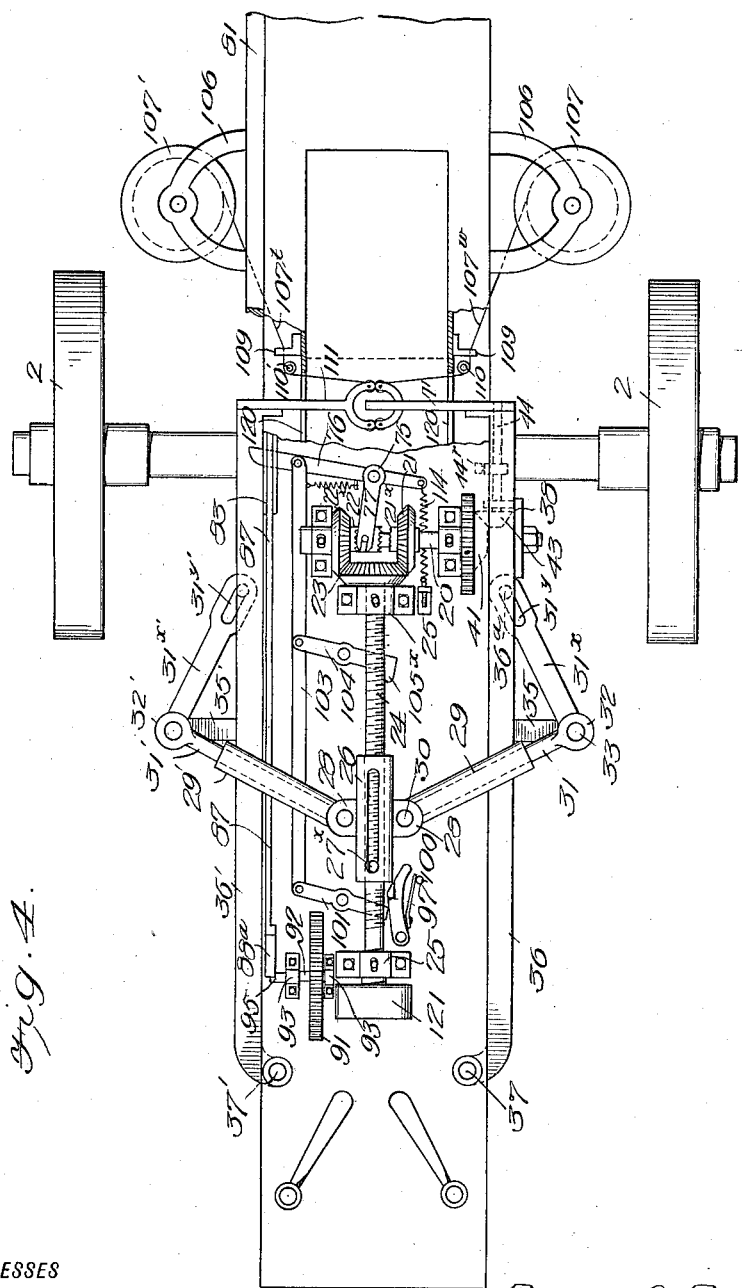

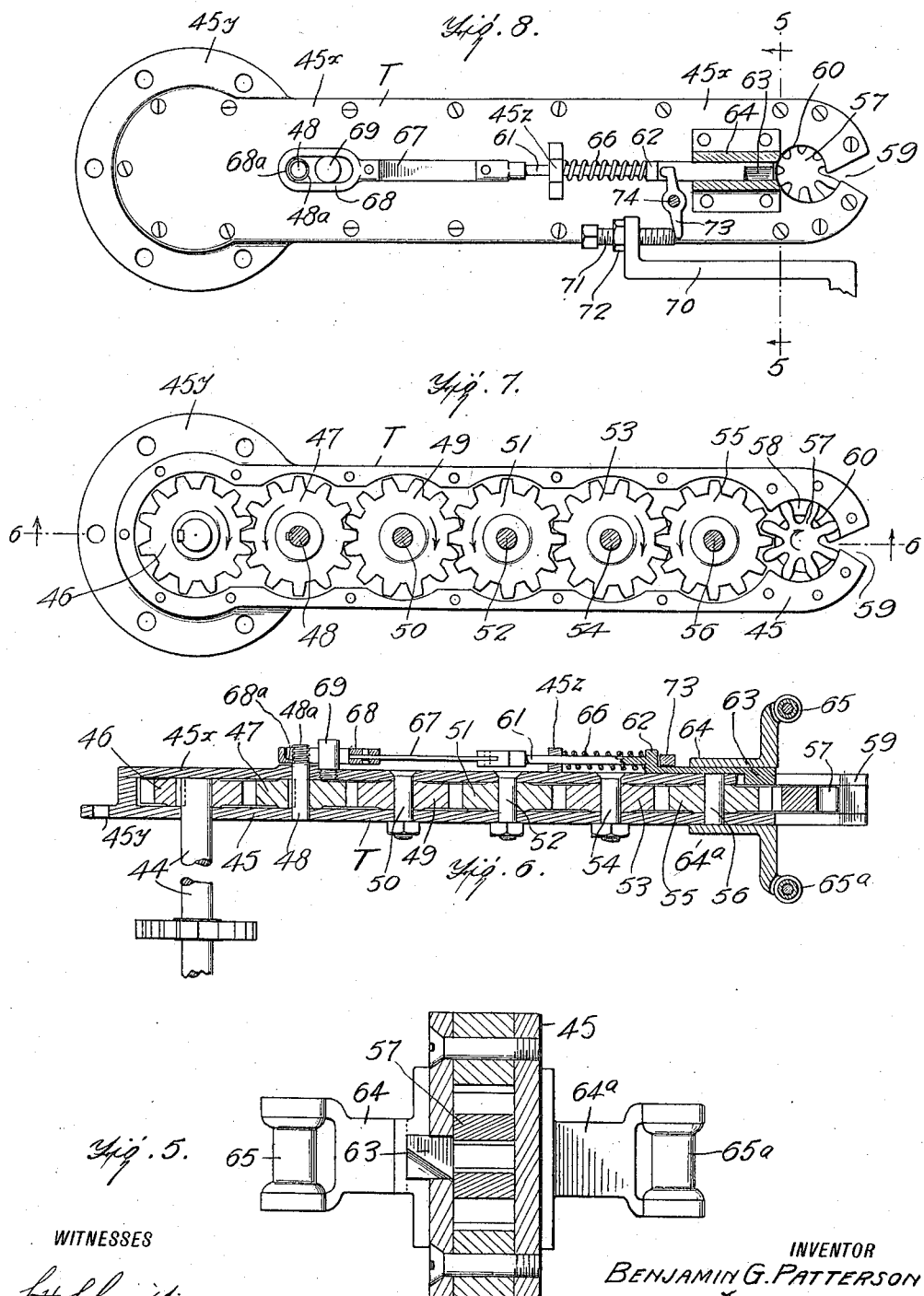

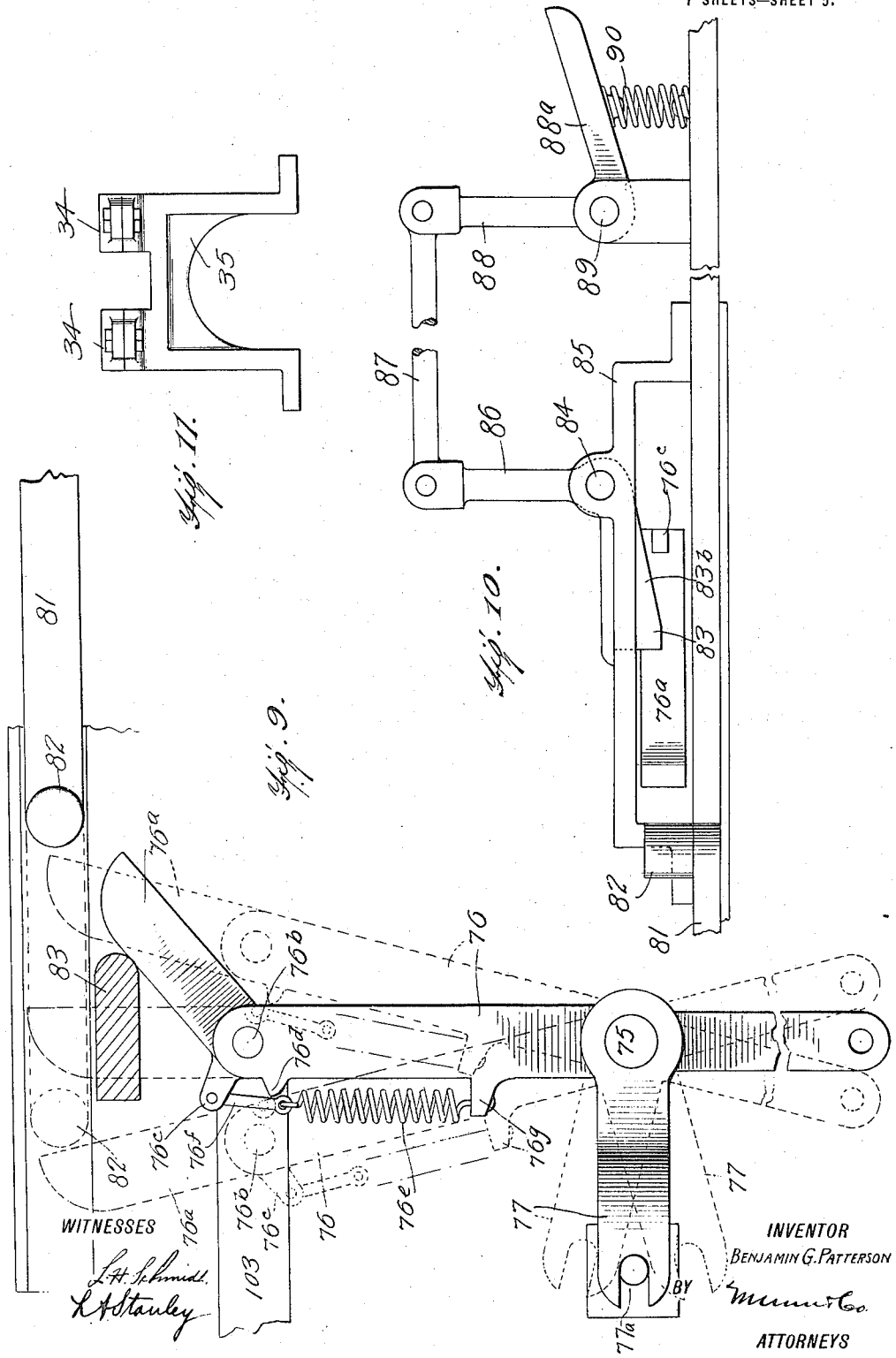

B. G. PATTERSON.
HAY BALE TYING DEVICE.
APPLICATION FILED OCT. 25, 1913.
1,152,209.
Patented Aug. 31, 1915.
7 SHEETS—SHEET 6.
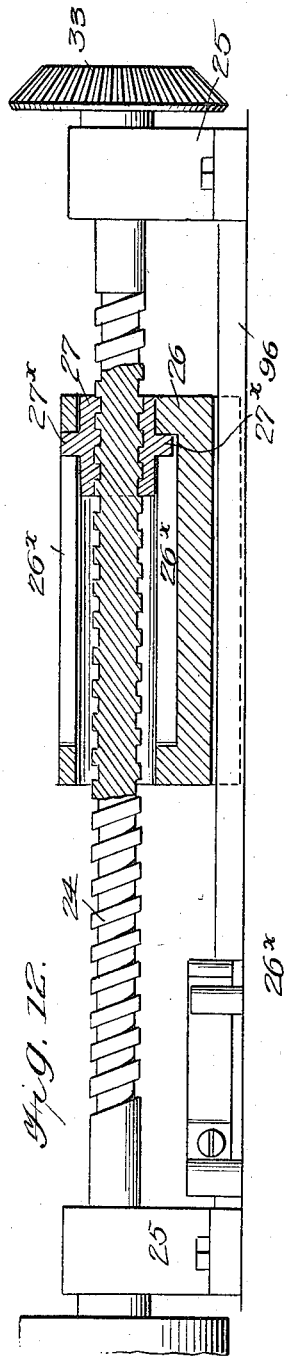
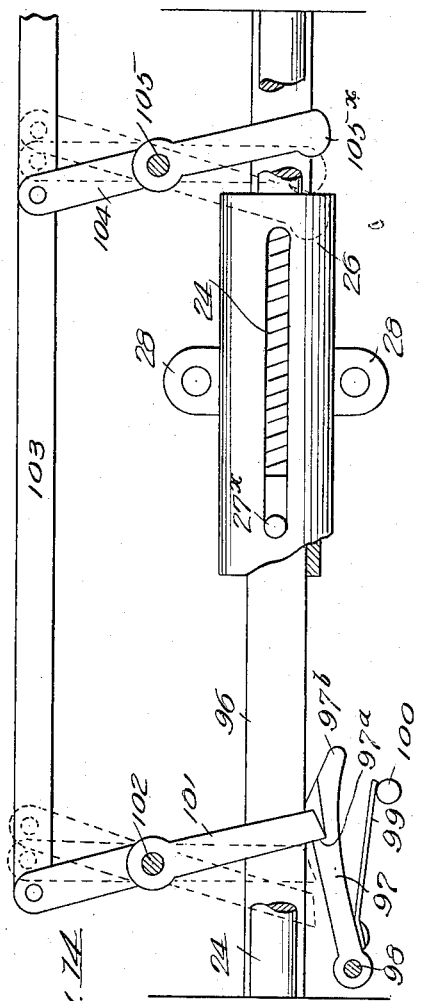
WITNESSES
INVENTOR
BENJAMIN C. PATTERSON
BY
ATTORNEYS B. G. PATTERSON.
HAY BALE TYING DEVICE.
APPLICATION FILED OCT. 25, 1913.
1,152,209.
Patented Aug. 31, 1915.
7 SHEETS—SHEET 7.
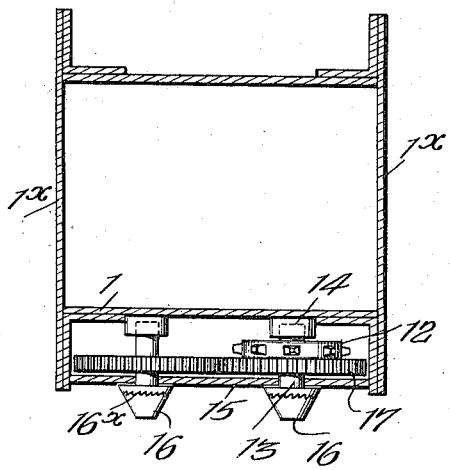
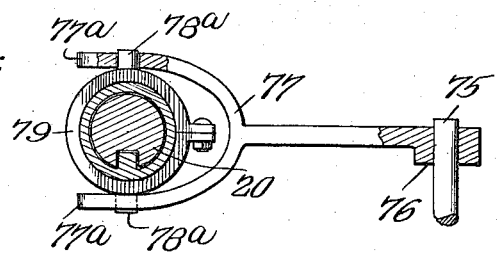
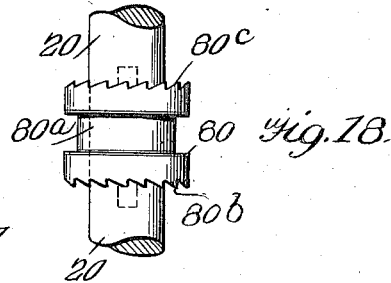
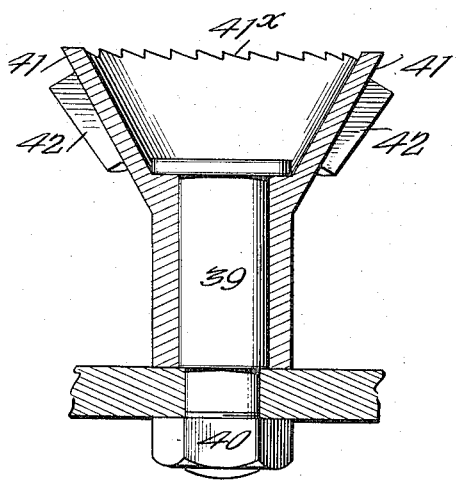
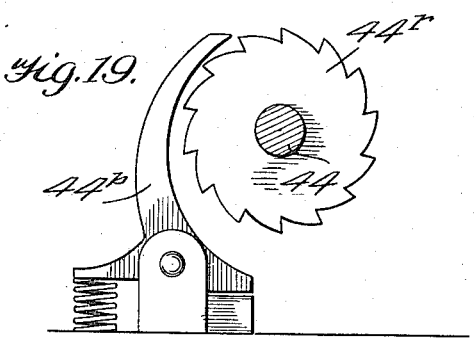
WITNESSES
INVENTOR
BENJAMIN G. PATTERSON,
BY
ATTORNEYS

UNITED STATES PATENT OFFICE.

BENJAMIN G. PATTERSON, OF OKLAHOMA, OKLAHOMA, ASSIGNOR TO THE PATTERSON-CLARK COMPANY, OF OKLAHOMA, OKLAHOMA, A CORPORATION OF OKLAHOMA.

HAY-BALE-TYING DEVICE.

1,152,209. Specification of Letters Patent. Patented Aug. 31, 1915.

Application filed October 25, 1913. Serial No. 797,283.

*To all whom it may concern:*

Be it known that I, BENJAMIN G. PATTERSON, a citizen of the United States, and a resident of Oklahoma city, in the county of Oklahoma and State of Oklahoma, have made certain new and useful Improvements in Hay-Bale-Tying Devices, of which the following is a specification.

My invention relates to improvements in automatic tying devices for bales of hay to be used in connection with or as an attachment to a hay baling device, and it consists in the combinations, constructions, and arrangements herein described and claimed.

An object of my invention is to provide a device which will automatically tie the bales as they are being formed, thereby obviating the necessity of employing hand labor for this purpose.

A further object of my invention is to provide an automatic tying device which performs its work with certainty, and in which the mechanism works independently of every irregularity in the feed.

A further object of my invention is to provide a tying device having a novel form of twisting mechanism.

A further object of my invention is to provide a tying device having a novel form of wire cutting mechanism.

Other objects and advantages will appear in the following specification and the novel features of the device will be particularly pointed out in the appended claims.

My invention is illustrated in the accompanying drawings forming part of this application in which—

Figure 1 is a side view of a hay baler equipped with my improved automatic tying mechanism, Fig. 2 is an enlarged view of the rear portion of the side opposite that shown in Fig. 1, Fig. 3 is a plan view of the rear portion of the baler showing one position of the tying attachments, Fig. 4 is a view similar to Fig. 3 showing the parts of the tying mechanism in a different position, Fig. 5 is an enlarged detail sectional view along the line 5—5 of Fig. 8, Fig. 6 is a section through the tying arm along the line 6—6 of Fig. 7, Fig. 7 is a view of the tying arm with the cover plate removed, Fig. 8 is a face view of the tying arm, Fig. 9 is a detail plan view of a clutch lever, Fig. 10 is a detail side view of a locking device for the clutch lever, Fig. 11 is a detail view of a bearing for one of the shafts, Fig. 12 is a sectional view through a toggle block showing the screw for operating the same, Fig. 13 is a sectional view through one of the toggle arms, Fig. 14 is a detail plan view of certain of the operating levers, Fig. 15 is a section through the baling chamber, Fig. 16 is a detail section showing one of the clutch members, Fig. 17 is a section through the clutch yoke, Fig. 18 is a plan view of the clutch member shown in Fig. 17, and Fig. 19 is a side view of the pawl and ratchet mechanism.

In carrying out my invention I make use of any suitable baling device which has a reciprocating plunger, and means for operating the same to compress the hay or other material which is fed into the baling chamber in advance of the plunger head.

In the drawings accompanying the specification I have shown my invention as applied to an old form of power hay press. The hay baler or press proper forms no part of my invention except in so far as it coöperates with the tying mechanism. I will therefore describe only enough of the hay baler so as to give a clear idea of the operation of the automatic tying device.

Referring now to Fig. 1 I have shown therein a baler of the type mentioned which comprises a baling chamber 1 supported on the wheels 2. A frame 3 bears a drive shaft 4 upon which is mounted a drive pulley 5. On the shaft 4 is also mounted a sprocket wheel 6, which is connected by a sprocket chain 7 with a sprocket wheel 8 on a shaft 9. The shaft 9 has a second sprocket 10 upon which is a chain 11, the latter passing forwardly and around a sprocket 12 on a shaft 13 (see Fig. 15). The latter is journaled in a bearing block 14 attached to the side of the baling chamber 1 at one end and at the other is journaled in a plate 15 which extends between the flanges $1^x$ which are formed by continuations of the tops and bottoms of the baling chamber, as clearly shown in Fig. 15. The outer end of the shaft 13 carries a cone clutch member 16 which is provided with clutch teeth $16^x$ at its base.

A gear 17 is provided on the shaft 13 (see Fig. 15) and is arranged to mesh with a gear 18 (see Fig. 1) which in turn meshes with a gear 19 on a shaft 20 (see Figs. 1, 3 and 4) which is provided with a loosely mounted beveled gear 21 having a clutch member 21ˣ secured thereto. This shaft also bears a beveled gear 22 loosely mounted and provided with a clutch member 22ˣ. A beveled gear 23 engages both the gears 21 and 22, as shown in Figs. 3 and 4.

The gear 23 is on the end of a screw shaft 24, which is mounted in bearings 25 (see Fig. 12). The screw shaft 24 passes through a traveling block 26, which is provided on its interior with a nut 27 having laterally extending lugs 27ˣ arranged to extend in grooves 26ˣ in the block 26. It will be noted that these grooves terminate short of the ends of the block 26 leaving abutments against which the lugs 27 may engage to move the block.

Referring again to Figs. 3 and 4 I have shown the block 26 as being provided with ears 28 to which are pivotally connected toggle members like that shown in Fig. 13. A description of one of these toggle members will suffice since they are both alike. It consists of a sleeve or telescopic member 29 which is secured to the ears by a pivot pin 30, and which receives a telescopic member 31 which has a head 32 rigidly secured to a shaft 33 (see Fig. 1) and journaled in vertical bearings 34. These bearings 34 are shown in detail in Fig. 11 being carried by a bracket 35 bolted to the side of the baling chamber. At 36 I have shown one of the oscillating frames.

As will be seen from the drawings there are two of these frames 36 and 36′ on opposite sides of the device. The frame 36 is pivoted at 37 to a bearing carried between the upper and lower flanges on the side of the baling chamber. An arm 31ˣ is rigidly secured to the shaft 33 between the upper and lower bearings 34 (see Fig. 1) and forms in fact with the member 31 a bell-crank lever. One end of the arm 31ˣ is slotted, as shown at 31ʸ and is arranged to engage pins 36ᵃ carried by the frame 36.

The frame 36 bears a vertically extending plate 38 on the outside thereof (see Figs. 1, 3 and 4) bearing upper and lower stub shafts like that shown at 39 in Fig. 16. These stub shafts are held to the plates by means of nuts 40 and bear hollow cone shaped clutch members 41 provided with gear teeth 42 on their outer surfaces and have clutch teeth 41ˣ at their ends, as clearly shown in Fig. 16. The clutch teeth 41ˣ are designed to engage the clutch teeth 16ˣ of the clutch member 16 (see Fig. 15), thereby communicating the motion of the clutch member 16 to the clutch member 41, which in turn drives a bevel gear 43 on a shaft 44 carried by the frame 36 (see Figs. 3 and 4).

The tying arms are denoted in general by T. They are both alike and a description of one will suffice for both. These arms are secured to the frame 36 and project at right angles thereto, as clearly shown in Figs. 3 and 4. Each arm consists of a casing 45 and a cover portion 45ˣ secured to the casing. The case has an integral circular plate 45ʸ by means of which it may be bolted to the end of the frame 36. The shaft 44 extends into the casing and a gear 46 is carried by the end of the shaft 44 within the casing. The gear 46 engages a gear 47 on a stub shaft 48. The gear 47 in turn engages a gear 49 on a stub shaft 50. The gear 49 engages a gear 51 on a shaft 52. The gear 51 engages a gear 53 on a shaft 54. The gear 53 engages a gear 55 on a shaft 56, while the gear 55 engages the teeth of a twister 57 whose teeth, as will be seen from Fig. 7, are deeply cut so as to receive the wires which are to be used in tying the bales. This twisting device is journaled in the circular recess 58 in the casing 45, see Fig. 7. The end of the casing 45 and the end of the cover portion 45ˣ are cut away, as shown at 59 to permit the entrance of the wire, while the walls of the casing 45 and of the cover portion 45ˣ are cut on a spiral curve 60 (see Figs. 7 and 8).

The cover portion 45ˣ of the casing is provided with a guide lug 45ᶻ (see Figs. 6 and 8) through which the stem 61 of the wire cutter is carried. The latter is provided with an offset at 62 and has a cutter head 63, which is arranged to reciprocate in the body portion of a bracket 64 carried by the casing cover 45ˣ. The bracket 64 is bent laterally and then forwardly and bears a roller 65 at its end. A similar bracket 64ᵃ is carried by the arm on the opposite side and is provided with a roller 65ᵃ similar to the roller 65. The shape of these rollers 65 and 65ᵃ is best shown in Fig. 5. A spring 66 is disposed between the lug 45ᶻ and the offset portion 62 of the cutter stem. On the opposite side of the lug 45ᶻ the cutter stem is provided with a spring 67 having at its upper end a link 68 through which a guide pin 69 extends. The upper inner edge of the link 68 is provided with a tooth 68ᵃ (see Fig. 6) arranged to engage the square threads 48ᵃ at the end of the shaft 48 (see Figs. 6 and 8). The spring 67 tends normally to hold the link in the position shown in Fig. 6.

Secured to the side of the baling chamber is a bracket 70 having a laterally bent end which carries an adjustable screw 71 provided with a lock nut 72. The end of the screw is arranged to bear on a lever 73, which is pivoted at 74 on the outside of the cover portion 45ˣ, and whose end is arranged to engage the shoulder 62 so as to retract the knife, as will be explained later.

Referring now particularly to Figs. 3, 4 and 9 I have shown therein a stud or shaft 75 which is secured to the top of the baling chamber. To this stud or shaft is pivoted a lever 76 having a yoke 77 extending at right angles to the lever and secured rigidly to the lever. The arms of the yoke 77 are sloted, as shown at 77ª (see Fig. 17) to receive the pins or lugs 78ª of a collar or strap 79 which is disposed in a groove 80ª of a clutch member 80 which is keyed to the shaft 20. The clutch member 80 is provided with teeth 80ᵇ on one side and 80ᶜ on the other. The former are arranged to engage the clutch teeth 21ˣ carried by the gear 21, while the latter are arranged to engage the clutch teeth 22ˣ carried by the gear 22, these last named gears 21 and 22 being, as previously stated, loosely mounted on the shaft 20. It will therefore be seen that when the lever 76 is moved in one direction the gear 21 will be connected with the drive shaft 20, while when it is moved in another direction the gear 22 will be connected to the drive shaft.

The lever 76 is provided at one end with an extension 76ª (see Fig. 9) which is pivotally mounted on the lever at 76ᵇ and which is provided with an arm 76ᶜ arranged to engage a stop member 76ᵈ carried by the lever 76. A spring 76ᵉ is connected at one end to a link 76ᶠ which in turn is connected to the arm 76ᶜ, the other end of the spring being connected to a projection or lug 76ᵍ.

At 81 I have shown a reciprocating plunger which works in a channel track at the edge of the upper plate of the baling chamber. This plunger has a backward and forward movement with each stroke of the hay press ram. It may be operated by a connection with one of the levers which operates the condenser fingers, or it may be connected in several ways to the different moving parts of the baler. Disposed at the rear end of the plunger and integral with it is a lug 82 which projects above the upper chamber plate and is adapted to engage the extension 76ª to cause the movement of the lever 76 and the consequent reversal of the rotation of the screw 24.

In Fig. 9 I have shown a locking member 83, which is arranged to engage the extension 76ª to hold it out of engagement with the lug 82. The member 83 is pivoted at 84 (see Fig. 10) upon a bracket 85. It really forms part of a bell-crank lever whose other arm 86 is connected by a rod 87 which is pivotally connected by a link with another bell-crank lever 88, which is pivoted at 89, and which has an arm 88ª normally pressed upon by a spring 90, so as to keep the member 83 in its downward or locking position in the path of the extension 76ª.

As will be seen from Figs. 2, 3 and 4 a toothed wheel 91 is mounted on a shaft 92 carried by adjustable bearings 93. This wheel extends through the top of the baling chamber and slightly beneath the upper plate of the baling chamber, as shown by dotted lines in Figs. 1 and 2. It is designed that this wheel shall be engaged by the movement of the bale during its passage through the chamber so as to turn the wheel. As will be seen from Fig. 2, the shaft 92 is provided with an adjustable crank arm 94 (see Fig. 2) having at its end a lug or roller 95 arranged to engage the spring-pressed arm 88ª. It will be seen that every time the lug or roller 95 makes one revolution the member 83 (see Fig. 10) will be lifted and immediately returned to its locking position.

Referring now particularly to Figs. 13 and 14 I have shown the block 26 as being provided with a dovetailed slot 26ˢ arranged to receive a track member 96 so as to slide therealong. The track 96 is secured to the top of the bailing chamber. Referring now to Fig. 14, it will be seen that a locking dog 97 is pivoted on a stud 98 being provided with a locking shoulder 97ª. The dog is normally pressed upon by a spring 99, one end of which bears on a pin or lug 100. A lever 101 is pivoted at 102 and is pivotally connected by means of a link 103 with the lever 76. It also has a pivotal connection with a lever 104 which is mounted at 105 and which is provided with a rounded end 105ˣ arranged to be engaged by the movable block 26.

Secured on one side of the baling chamber on brackets 106 are upper and lower reels 107 and 108 respectively. These reels are designed to contain the wire which is used to tie the bales. On the opposite side of the baling chamber are similar reels 107' and 108'. The wire 107ʷ passes from the reel 107 through the guide member 109 and around a roller 110 inwardly into the baling chamber, while the wire 107ᵗ from the reel 107' passes around the guide member 109' over the roller 110' and joins the wire 107ʷ (see Fig. 4).

As has been stated before, there is a second oscillating frame 36' on the opposite side of the baling chamber (see Fig. 4), with similar toggle joint mechanism for operating the frame similar to that already described having parts 29', 31', 35', 31ˣ', 31ʸ', etc., corresponding with the parts on the opposite side of the device. The frame 36' bears at its end an arm 111 which is provided with brackets 112 having rollers similar to the rollers 65 and 65ª on the arm T.

From the foregoing description of the various parts of the device the operation thereof may be readily understood.

The hay is fed into the opening 113 at the top of the baling chamber (see Fig. 3) and the plunger is reciprocated in the usual manner, thereby forcing the hay forwardly and compressing it. It is first necessary to bring the ends of the wires from the two upper reels 107 and 107' forwardly into the center of the baling chamber and to tie them there, the ends of the wires on the two lower spools or reels 108 and 108' being similarly brought to the center of the baling chamber and tied. During the operation of the baler the plunger 81 reciprocates with each reciprocation of the arm T as stated, while the hay is being compressed. As the hay is rammed into the chambers it carries the wires with it. Now when the first bale has been formed to the desired length it is necessary to lift the locking member 83 by hand, as the wheel 91 has not yet come into contact with the bale.

During the process of forming the bale the apparatus occupies the position shown in Figs. 1, 2 and 3 except the extension 76ª which occupies the position shown in solid lines in Fig. 9, being held there by the locking member 83. When, however, the locking member 83 is lifted the spring 76ᵉ will cause the extension 76ª to be moved into alinement with the lever 76 into the path of the reciprocating lug 82 carried by the plunger 81. Now on a forward stroke of the plunger the lug will engage the end 76ª and carry it into the position shown in dotted lines in Fig. 9 to the left of the full line position. This will cause the yoke 77 to move the clutch member 80 toward the gear 21 when the teeth 80ᵇ on the clutch member 80 will engage the teeth 21ˣ on the gear 21, thereby connecting the gear 21 with the shaft 20. As has been stated before, the shaft 20 is revolved by the gear 19, which meshes with the gear 18, this gear being driven by the sprocket 12 (see Fig. 15) through the medium of the sprocket chain 11 and sprocket connections 10, 9, 8, 7, 6 and 4 to the power wheel 5. The rotation of the gear 21 will cause the screw 24 to rotate thereby causing the travel of the nut 27 from one end of the block to the other. Upon reaching the opposite end of the block the projections 27ˣ on the nut 27 (see Fig. 12) will engage the ends of the block 26, thereby sliding the latter on the track 96 toward the locking member 97. When the end of the block reaches the beveled end 97ᵇ of the locking member 97 it will force the locking member so as to disengage the lever 101, thereby permitting the lever 76 to be swung from the dotted line position at the left of Fig. 9 to the dotted line position at the right of Fig. 9 under the tension of the spring 114 (see Figs. 3 and 4).

While the block 26 is traveling from right to left (see Fig. 3) the toggle joint will be flexed and through the medium of the arms 31 and 31ˣ will cause the frames 36 and 36' to swing inwardly, thus bringing the arms T and 111 in against the wires on either side of the device. It will be understood that there are two of these arms T, an upper and a lower arm, as shown in Fig. 1 for the upper and lower wires respectively. The wires on one side of the device enter the slots 59 in the ends of the arms and pass between the teeth of the twisting member 57. In Fig. 3 it will be seen that the rollers on the arm T engage the wire 107ʷ before they engage the wire 107ᵗ. As the frame nears the side of the baling chamber a ratchet 44ʳ (see Figs. 3 and 19) carried by the shaft 44 is brought into engagement with a spring-pressed pawl 44ᵖ secured on the side of the baling chamber. This turns the shaft 44 a third of a turn and through the medium of the train of gears in the arm T causes the twisting member to move a part way around. Subsequently when the rollers on the arms T and 111 come into contact the wire 107ᵗ on the opposite side passes into the slot 59 between the teeth of the twisting member 57.

When the frame 36 swings into close contact with the sides of the baling chamber, the clutch 41 engages the clutch member 16 which is on the shaft 13, and which is being driven by the sprocket 12 (see Fig. 15). This causes the rotation of the member 41 which, through the medium of the bevel gear 43, drives the shaft 44, thereby rotating the gears in the arm T and twisting the wires around one another.

During the rotation of the shaft 48 the link 68 is gradually forced to the end of the shaft by the fact that the tooth 68ª engages the threaded end. As soon as it has passed off the end of the shaft the spring 66 forces the cutter downwardly and this cuts the wires at approximately the center of the twisted part, leaving the bale tied up and leaving the ends of the wires which are wound on the spools or reels tied together in the center of the baling chamber preparatory to receiving the new bale.

I have explained how the lever 76 is forced into the dotted line position on the right of Fig. 9. This will swing the yoke 77 from the lower dotted line position in Fig. 9 to the upper dotted line position in Fig. 9, thereby bringing the clutch members 22ˣ and 80ᶜ into engagement so as to reverse the travel of the screw. The nut 27 will now travel in the opposite direction, and when it reaches the end of the slot in the block 26 will carry the block with it. This will cause the withdrawal of the frames 36 and 36' into the position shown in Fig. 3. As the arm T is about to reach its normal position shown in Fig. 3 the screw 71 carried by the arm 70 (see Figs. 3 and 8) engages the lever 73 which forces the cutter head upwardly and permits the link at the end of the spring 67 to again assume its position over the screw 48, thereby retracting the cutter preparatory to the subsequent inward movement of the arm T.

When the block 26 reaches the end of its backward stroke it engages the end 105ˣ of the lever 104 and brings the lever 76 through the medium of the link 103 to its central position shown in Fig. 3. The block 26 having moved away from the dog or locking member 97 the latter springs in behind the lever 101, which is, of course, moved simultaneously with the lever 105, thus locking the lever 76 in its central position. When the lever 76 is in its central position the clutch members carried by the yoke 77 will be free, therefore the screw 24 is not revolved.

It has been before stated that when the locking member 83 is lifted the extension 76$^a$ is permitted to pass beneath the locking member, as shown in Fig. 9. When, however, the extension is pushed forwardly it raises the locking member 83, owing to the beveled surface 83$^b$ (see Fig. 10) and passes into the full line position shown in Fig. 9. Immediately after the extension has passed the locking member on the forward movement of the lever, i. e., into the position shown on the right of Fig. 9, the locking member drops in behind it so that when the lever is brought to its middle position by the movement of the lever 105, as explained, the extension 76$^a$ is kept out of the path of the reciprocating lug 82 by the locking member 83.

I have shown how the apparatus has tied a bale and has been restored to its original position. When another bale is formed the first bale, of course, passes out through the end of the baling chamber and in doing so it engages the wheel 91 and rotates the latter. This wheel can be made of any desired size, thereby affording means of tying bales of any predetermined length. As has been before explained, the initial movement of the tying mechanism is started by the rotation of the wheel 91 which is mounted on the shaft 92 that bears the adjustable crank arm 94 having the roller 95. This roller or stud 95 engages the bell-crank lever having the arm 88$^a$ (see Fig. 2) in the subsequent operations of the machine, thereby rendering the tying operation automatic after the device has been once started by hand, as before explained.

I have already explained that the block 26 is provided with a slot. The purpose of this slot is to permit the nut to travel the length of the block and the length of the slot before it engages the block 25. This gives time for the ram (not shown) to retract toward the front enough to clear the way for the arms T and 111 to enter the openings 120 in the baling chamber. When the screw 24 reverses its movement the lugs 27$^x$ will travel through the slot in the block 26, thereby giving the twister member time to twist or tie the wires together before the arms T and 111 are retracted. In order to insure perfect clearance and the return of all parts to their perfect normal position I make use of a fly wheel 121 carried by the screw shaft 24 by which the movement of the screw shaft is continued slightly beyond the point where the driving clutches are disengaged.

The device described performs its work with certainty and it is obvious that its mechanism works independent of irregularity in feed since a bale of a certain length must be formed before the tying device is brought into operation. It ordinarily requires two expert tiers to hand tie for a belt power press. In the "wooden block" system one stroke of the ram is lost in every seven or eight strokes to permit the blocks to be placed in the chamber. My device is intended to perform the work of the tiers and to dispense with the "wooden block" system altogether.

I claim:—

1. In a bale tying device, the combination with a baling chamber having openings to permit the entrance of tie wires, of means for twisting said tie wires together, said means comprising a pair of movable arms arranged to enter through the sides of said baling chamber, one of said arms being provided with a twisting member arranged to receive the tie wire, means for rotating said twisting member, a spring-pressed cutter carried by the arm which bears the twisting member, and means for releasing the cutter to permit the cutting of the wires.

2. The combination with a baling chamber having openings to permit the entrance of tie wires transversely of the baling chamber; of a pair of frames pivoted to said baling chamber and movable toward and away from the sides of the chamber, laterally extending arms secured to the ends of the frames and arranged to extend into said baling chamber, said arms being arranged to engage the tie wires in rear of the bale, means carried by one of said arms for twisting the tie wires together, means for cutting the tie wires through the twisted portion, and means actuated by the passage of the bale through the chamber for swinging the frames and thereby bringing the arms into engagement with the tie wires.

3. The combination with a baling chamber having openings to permit the entrance of tie wires transversely of the baling chamber; of a pair of frames pivoted to said baling chamber and movable toward and away from the sides of the chamber, laterally extending arms secured to the ends of the frames and arranged to extend into said baling chamber, said arms being arranged to engage the tie wires in rear of the bale, means carried by one of said arms for twisting the tie wires together, means for cutting the tie wires through the twisted portion, means actuated by the passage of the bale through the chamber for swinging the frames and thereby bringing the arms into engagement with the tie wires, twisting mechanism carried by one of said arms, and mechanism carried by one of said frames and arranged to be brought into operative position through the movement of the latter for causing the operation of the twisting mechanism.

4. In a bale tying device, a baling chamber, a frame pivotally mounted on each side thereof, an arm carried at the free end of each of said pivoted frames, one of said arms being provided with a twisting device, means for periodically swinging said frames toward and away from the sides of said baling chamber, said means comprising a toggle joint connected at one end to one of said frames and at the other end to the other of said frames, and means for moving the central portion of the toggle joint longitudinally of the device.

5. In a bale tying device, a baling chamber, a frame pivotally mounted on said baling chamber on each side thereof, each of said frames bearing a laterally extending arm arranged to enter the baling chamber, one of said arms being provided with a twisting device, a toggle joint for moving said frames, said toggle joint comprising a slidable block, a screw arranged to pass through said block, a nut carried by the screw and arranged to engage the block, and means for rotating said screw.

6. In a bale tying device, a baling chamber, a frame pivotally mounted on said baling chamber on each side thereof, each of said frames bearing a laterally extending arm arranged to enter the baling chamber, one of said arms being provided with a twisting device, a toggle joint for moving said frames, said toggle joint comprising a slidable block, a screw arranged to pass through said block, a nut carried by the screw and arranged to engage the block, means for rotating the screw in one direction and means for reversing the rotation of the screw.

7. In a bale tying device, a support, a frame pivotally mounted on said support, means for swinging said frame, an arm carried by said frame at the end thereof, said arm comprising a hollow casing, brackets carried on each side of said hollow casing, rollers carried by said brackets, the end of said casing between the rollers being provided with a slot, a twisting member rotatably mounted at the end of said arm within the casing, and means carried by the frame and arm for rotating the twisting member.

8. In a bale tying device, a support, a frame pivotally mounted on said support, means for swinging said frame, an arm carried by said frame at the end thereof, said arm comprising a hollow casing, brackets carried on each side of said hollow casing, rollers carried by said brackets, the end of said casing between the rollers being provided with a slot, a twisting member rotatably mounted at the end of said arm within the casing, a shaft carried by the frame, gears carried within the casing and operated by the movement of said shaft for rotating the twisting member, and means for rotating said shaft.

9. In a bale tying device, a support, a frame pivotally mounted on said support, means for swinging said frame, an arm carried by said frame at the end thereof, said arm comprising a hollow casing, brackets carried on each side of said hollow casing, rollers carried by said brackets, the end of said casing between the rollers being provided with a slot, a twisting member rotatably mounted at the end of said arm within the casing, a shaft carried by the frame, gears carried within the casing and operated by the movement of said shaft for rotating the twisting member, means for rotating said shaft, and a cutter carried by said arm and operated by the movement of the gears within the arm.

10. In a bale tying device, a movable tying arm comprising a casing, a train of gears carried thereby, one end of said casing being provided with a slot, the walls of the casing adjacent to the slot being provided with an opening having spiral-shaped edges, and a twisting member rotatably carried by the casing and having inwardly extending slots arranged to register with the slot in the end of the casing.

11. In a bale tying device, a movable tying arm comprising a casing, a train of gears carried thereby, one end of said casing being provided with a slot, the walls of the casing adjacent to the slot being provided with an opening having spiral-shaped edges, a twisting member rotatably carried by the casing and having inwardly extending slots arranged to register with the slot in the end of the casing, and a cutting member slidably carried by said casing adjacent to one of the openings in the walls of the casing.

12. In a bale tying device, an arm comprising a hollow casing having a slot at one end, a circular twisting member provided with inwardly extending slots arranged to register with said first mentioned slot, the walls of the casing adjacent the slot being provided with openings having spiral-shaped edges, a cutter carried by the casing, a spring for normally pressing said cutter toward said end slot, and means for normally holding said cutter against the tension of the spring and for releasing it at a predetermined time.

13. In a bale tying device, an arm comprising a hollow casing having a slot at one end, a circular twisting member provided with inwardly extending slots arranged to register with said first mentioned slot, the walls of the casing adjacent the slot being provided with openings having spiral-shaped edges, a cutter carried by the casing, a spring for normally pressing said cutter toward said end slot, means for normally holding said cutter against the tension of the spring and for releasing it at a predetermined time, said last named means comprising a spring secured to said cutter and having a link provided with a tooth, a shaft journaled in said casing and having a threaded end arranged to be engaged by said tooth, and means for rotating the shaft to force the tooth off the end thereof.

14. The combination with a baling chamber having openings in its side walls, of a frame pivotally mounted on said baling chamber on each side thereof, an arm connected to each of said frames and arranged to extend through the openings in said baling chamber, twisting mechanism carried by one of said arms, a gear mounted on said baling chamber, means for driving said gear, a clutch member carried by said gear, a clutch member mounted on one of said pivot frames, and means connecting said last named clutch member with said twisting mechanism for operating the latter.

15. The combination with a baling chamber having openings in its side walls, of a frame pivotally mounted on said baling chamber on each side thereof, an arm connected to each of said frames and arranged to extend through the openings in said baling chamber, twisting mechanism carried by one of said arms, a gear mounted on said baling chamber, means for driving said gear, a clutch member carried by said gear, a clutch member mounted on one of said pivot frames, and means connecting said last named clutch member with said twisting mechanism for operating the latter and means for moving said twisting mechanism prior to the engagement of said clutch members.

16. The combination with a baling chamber having openings in its sides, of a frame pivotally mounted on said baling chamber, an arm carried by the frame at one end thereof and arranged to enter the opening of said baling chamber, twisting mechanism carried at the free end of said arm, a shaft carried by said frame, gears carried by said arm for imparting the movement of the shaft to the twisting mechanism, a clutch member carried by the frame for driving said shaft, a clutch member rotatably mounted on the baling chamber and adapted to be engaged by the first named clutch member through a movement of the frame and means for driving said second named clutch member.

17. The combination with a baling chamber having openings in its sides, of a frame pivotally mounted on said baling chamber, an arm carried by the frame at one end thereof and arranged to enter the opening of said baling chamber, twisting mechanism carried at the free end of said arm, a shaft carried by said frame, gears carried by said arm for imparting the movement of the shaft to the twisting mechanism, a clutch member carried by the frame for driving said shaft, a clutch member rotatably mounted on the baling chamber and adapted to be engaged by the first named clutch member through a movement of the frame and means for driving said second named clutch member, a ratchet on said shaft and a spring pressed pawl carried by said baling chamber and arranged to engage said ratchet member by the engagement of the clutch members.

18. The combination with a baling chamber having openings in its sides, of a frame pivotally mounted on said baling chamber, an arm carried by the frame at one end thereof and arranged to enter the opening of said baling chamber, twisting mechanism carried at the free end of said arm, a shaft carried by said frame, gears carried by said arm for imparting the movement of the shaft to the twisting mechanism, a clutch member carried by the frame for driving said shaft, a clutch member rotatably mounted on the baling chamber and adapted to be engaged by the first named clutch member through a movement of the frame and means for driving said second named clutch member, a ratchet on said shaft and a spring pressed pawl carried by said baling chamber and arranged to engage said ratchet member by the engagement of the clutch members and means for reciprocating the frame periodically.

19. The combination with a baling chamber having an opening, of a frame pivotally arranged on one side of said baling chamber, an arm carried by the frame at one end thereof and arranged to enter the opening of said baling chamber, wire twisting mechanism carried by said arm, a cutting device mounted on one side of said arm and arranged to slide parallel therewith, a spring for holding said cutting mechanism normally out of tension, means for operating said twisting mechanism, means operated by the last named means for releasing the cutter and means operated by the movement of the arm out of the baling chamber for again placing the cutter under spring tension and for retaining it in position.

20. In a bale tying device, the combination with a baling chamber, of a slidable plunger carried thereby, a frame pivoted to said baling chamber on each side thereof, an arm carried at the end of each of said frames and arranged to extend into the baling chamber, twisting mechanism carried by one of said arms, means for moving the frame, means for operating the twisting mechanism, and mechanism for reversing the movement of the frame periodically, said mechanism being operated by the movement of said plunger.

21. In a bale tying device, the combination with a baling chamber, of a slidable plunger carried thereby, a frame pivoted to said baling chamber on each side thereof, an arm carried at the end of each of said frames and arranged to extend into the baling chamber, twisting mechanism carried by one of said arms, means for moving the frame, means for operating the twisting mechanism, mechanism for reversing the movement of the frame periodically, said mechanism comprising a clutch member, a gear on either side thereof having clutch members arranged to be engaged by said first mentioned clutch member, a lever having a spring-pressed extension arranged to extend into the path of the reciprocating plunger, means for holding the extension normally out of the way of the plunger, and means for releasing the extension to permit its engagement by the plunger.

22. In a bale tying device, the combination with a baling chamber, of a slidable plunger carried thereby, a frame pivoted to said baling chamber on each side thereof, an arm carried at the end of each of said frames and arranged to extend into the baling chamber, twisting mechanism carried by one of said arms, means for moving the frame, means for operating the twisting mechanism, mechanism for reversing the movement of the frame periodically, said mechanism comprising a clutch member, a gear on either side thereof having clutch members arranged to be engaged by said first mentioned clutch member, a lever having a spring-pressed extension arranged to extend into the path of the reciprocating plunger, means for holding the extension normally out of the way of the plunger, means for releasing the extension to permit its engagement by the plunger, said last named means comprising a locking member arranged to engage the extension, a wheel carried by the chamber and arranged to extend within the chamber and to contact with the moving pawls, and means operated by the wheel for releasing the locking member.

BENJAMIN G. PATTERSON.

Witnesses:
L. H. PRICHART,
E. WHITTINGTON.

Copies of this patent may be obtained for five cents each, by addressing the "Commissioner of Patents, Washington, D. C."